Sept. 3, 1940. L. A. HYLAND Re. 21,550
SHIELDED SPARK PLUG
Original Filed Aug. 20, 1931
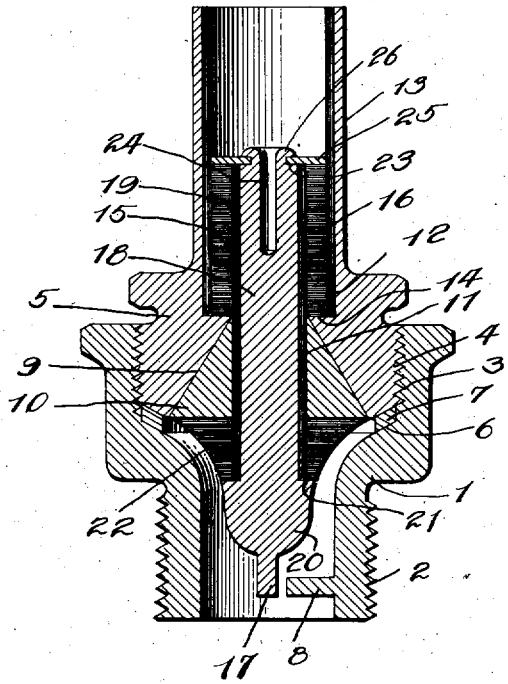
INVENTOR
Lawrence A. Hyland
BY Robert A. Lonender
ATTORNEY Reissued Sept. 3, 1940 Re. 21,550

UNITED STATES PATENT OFFICE 21,550

SHIELDED SPARK PLUG

Lawrence A. Hyland, Washington, D. C., assignor, by mesne assignments, to Bendix Aviation Corporation, South Bend, Ind., a corporation of Delaware Original No. 1,950,408, dated March 13, 1934, Serial No. 558,291, August 20, 1931, which is a division of Serial No. 375,241, July 1, 1929. Application for reissue February 26, 1935, Serial No. 8,415

8 Claims. (Cl. 123—169)

(Granted under the act of March 3, 1883, as amended April 30, 1928; 370 O. G. 757)

This invention relates to a shielded spark plug like that shown in my co-pending application Serial No. 375,241, July 1, 1929, of which this application is a division.

The objects of this invention are to provide a spark plug that will not interfere with radio receiving apparatus and to provide a sparkplug the parts of which will remain tightly assembled and prevent the escape of fuel on compression from the cylinders of an internal combustion engine, in spite of the vibration and the linear and volumetric changes due to temperature differences met in practice.

The single figure of the drawing is a longitudinal axial section through the present invention.

The extensive use of radio receivers in close proximity to internal combustion engines makes it desirable that the electric oscillations set up by the discharge between the electrodes of the spark plugs of such engines be prevented from interfering with the reception of radio signals.

The body 1 has a substantially cylindrical, externally threaded portion 2 that screws into the usual spark plug aperture in the cylinder wall of the engine wherein this device is used and an expanded portion 3, internally threaded at 4 to engage a co-acting threaded portion on the gland 5. Portion 3 is formed internally to act as a seat 6 for packing element 7, which insures a tight joint between gland 5 and body 1. The electrode 8 is grounded to the engine block through body 1.

Gland 5 has a frusto-conical recess 9 formed therein, and in said recess is seated a like shaped member 10 with an axial bore 11 therethrough. The recess 9 communicates with a cylindrical recess 12 in said gland, which recess is extended by tubular sleeve 13 which projects from said gland, the cross sectional area of the bore in said sleeve being the same as that of said recess. The base of recess 9 forms a shoulder 14 on which are seated the centrally apertured mica washers 15, and the tubular mica insulating element 16.

Central electrode 17 is carried by stem 18 which extends through bore 11 in conical member 10 and is substantiatlly enclosed in mica insulating element 19. Immediately adjacent electrode 17 stem 18 is expanded at 20 and a shoulder 21 is formed thereon. Element 19 and the series of mica washers 22 are seated on said shoulder, the washers being compressed between the shoulder and the base of frusto-conical member 10.

The upper end of stem 18 is reduced, forming a shoulder 23, and has an axially extending bore 24 therein. A metal washer 25 is seated on the shoulder 23 and the end of stem 18 is upset over the washer 25, as shown at 26, compressing mica washers 15 and 22, and securing the stem, mica washers, and frusto-conical member 10 in tight assembly with gland 5. Any changes in the metal parts of this assembly due to temperature differences will be taken up by the compressed mica washers, so there will be no relaxation or loosening of the parts thereof due to such changes or to vibration.

Connection to a wire is made by inserting in bore 24 a suitable contact element carried by such wire.

While mica has been mentioned as the insulating material in the present construction, it is to be understood that it is by way of description only, and not of limitation, as any substance having the requisite properties of limited compressibility, heat resistance, and electrical insulation will serve.

It is apparent that inasmuch as the electrode 8 is directly grounded to the engine block through body 1, and the metal parts directly connected to central electrode 17 are substantially enclosed in metal parts such as sleeve 13 and gland 5, that the electrodes are effectively shielded so that radiation of oscillations from discharges between said electrodes is prevented.

The herein described invention may be manufactured and used by or for the Government of the United States of America for governmental purposes without the payment of any royalties thereon or therefor.

I claim:

1. A spark plug, comprising a body member adapted to engage the wall of an engine cylinder, an electrode carried thereby, a gland engaged with said body member, said gland having a recess in one face thereof, an interfitting member disposed in said recess, said interfitting member having a passage therethrough, a tubular sleeve extending from the other face of said gland, a lining of insulating material within said sleeve extending into the recess in said gland, a stem extending through said interfitting member and into said sleeve, a sheath of insulating material around said stem extending substantitally to the upper end of said stem, heat resistant compressible insulating material disposed on each side of said member around said stem, means co-acting with said stem to place said material under compression, and an electrode carried by said stem adjacent the aforesaid electrode.

2. A spark plug, comprising a body member adapted to engage the wall of an engine cylinder, said body having an expanded interiorly threaded portion and a seat for a packing element adjacent the inner end of said threaded portion, a packing element on said seat, a gland engaged with said threaded portion and bearing against said element, said gland hasing a frusto-conical recess in one face and an annular recess in the other face, an axially gored frusto-conical member seated in said recess, a tubular sleeve extending from the said other face of said gland concentric with the said annular recess, a stem having an enlarged portion at one end with a shoulder formed on the inner face theretof, said stem extending through the bore in said frust-conical member and having the other end reduced to form a shoulder, an insulating sheath around said stem, heat resistant compressible insulating material around said stem on each side of said frusto-conical member, an insulating lining in said tubular sleeve extending into the annular recess in said gland, an axial bore in said stem at the reduced end thereof, a washer seated on the shoulder at the said reduced end and said reduced end upset over said washer, and an electrode on the enlarged portion of said stem disposed adjacent the aforesaid electrode.

3. A spark plug, comprising a body member adapted to engage the wall of an engine cylinder, an electrode carried thereby, a gland engaged with said body member, a stem passing through said gland, an electrode carried on said stem adjacent the aforesaid electrode, heat resistant compressible insulating material on each side of said gland around said stem, a sleeve extending outwardly from said gland beyond the outer end of said stem, and means coacting with said stem to place said material under compression.

4. A spark plug, comprising a body member adapted to engage the wall of an engine cylinder, an electrode carried thereby, a gland engaged with said body member, a stem passing through the said gland, said stem having a substantially cylindrical recess at its outer end adapted to receive a connection to a wire, an electrode carried on said stem adjacent the aforesaid electrode, heat resistant compressible insulating material on each side of said gland around said stem, a sleeve internally insulated throughout its length extending outwardly from said gland beyond the outer end of said stem, and means coacting with said stem to place said material under compression.

5. A spark plug, comprising a central electrode, a stem whereby said electrode is carried, said stem being adapted to have a conductor connected thereto and having a shoulder adjacent said electrode, a second electrode operatively disposed adjacent the aforesaid electrode, an insulating sheath around said stem, an axially bored frusto-conical member through which said stem and sheath extend, insulating means around said stem on each side of said member, means coacting with said shoulder to place said insulating means under compression, a body in which said member is mounted and to which said second electrode is connected and which is adapted to be connected to an engine block, an outwardly extending sleeve connected to said body, and an insulating liner in said sleeve, said sleeve and said body enclosing said electrodes and forming a grounded electrical shield therearound.

6. A spark plug, comprising a central electrode, a stem whereby said electrode is carried, said stem being adapted to have a conductor internally connected thereto and having a shoulder adjacent said electrode, a second electrode operatively disposed adjacent the aforesaid electrode, an insulating sheath around said stem, an axially bored frusto-conical member through which said stem and sheath extend, insulating means around said stem on each side of said member, means coacting with said shoulder to place said insulating means under compression, a body in which said member is mounted and to which said second electrode is connected and which is adapted to be connected to an engine block, an outwardly extending sleeve connected to said body and an insulating liner in said sleeve, said sleeve and said body enclosing said electrodes and forming a grounded electrical shield therearound.

7. A spark-plug comprising the combination of a central spindle, a mica sleeve about said spindle, a body in which the spindle and its mica sleeve are fixed, a barrel extending upward from said body above the spindle to form a socket for the insertion of an insulated high-tension conductor, a mica sleeve lining said barrel, a stack of mica washers occupying the space between said mica sleeves and bearing on a shoulder of the body, and means on the upper end of the spindle confining said stack.

8. A spark-plug comprising the combination of a central spindle, a mica sleeve about said spindle, a body in which the spindle and its mica sleeve are fixed, a barrel extending upward from said body above the spindle to form a socket for the insertion of an insulated high-tension conductor, a mica sleeve lining said barrel, a stack of mica washers occupying the space between said mica sleeves and bearing on a shoulder of the body, and a confining element bearing on the top of said stack, the upper end of the spindle passing through said confining element and being upset thereon.

LAWRENCE A. HYLAND.